United States Patent [19]

Kervagoret

[11] Patent Number: 4,844,118
[45] Date of Patent: Jul. 4, 1989

[54] ROTARY HYDRAULIC DISTRIBUTOR FOR A SERVO MECHANISM

[75] Inventor: Gilbert Kervagoret, Argenteuil, France

[73] Assignee: Bendix France, Drancy, France

[21] Appl. No.: 207,694

[22] Filed: Jun. 16, 1988

[30] Foreign Application Priority Data

Jun. 18, 1987 [FR] France ............................ 87 08506
Mar. 8, 1988 [FR] France ............................ 88 02204

[51] Int. Cl.$^4$ ............................................. F15B 13/04
[52] U.S. Cl. .............................. 137/625.21; 91/375 R
[58] Field of Search ................ 137/625.21, 625.22, 137/625.23, 625.24, 596; 91/375 A, 375 R

[56] References Cited

U.S. PATENT DOCUMENTS 4,465,099 8/1984 Kervagoret ...................... 91/375 A
4,699,174 10/1987 Bishop ............................... 91/375 A Primary Examiner—Alan Cohan
Attorney, Agent, or Firm—Larry J. Palguta; Ken C. Decker

[57] ABSTRACT

This distributor comprises an external element (3) mounted rotatably in a housing (1) and an internal element (10) mounted rotatably in the external element and capable of a limited rotation on either side of a neutral position. The external element (3) has inlet passage ports (17a), (17b) communicating with a fluid pressure source (5), at least one pair of distribution ports (19, 20) communicating selectively with one of the two opposite chambers of a drive means (8), and return recesses (18, 31) communicating permanently with the tank (15). The internal element (10) has longitudinal grooves (16) which, in the neutral symmetrical position, throttle the distribution ports in the same proportion and also ensure permanent communication between the inlet ports and some of the return recesses. In controlled return recesses (18), there is a movable throttling member (22, 23) which, under the effect of a control mechanism, is capable of varying the passage cross-section of the fluid return between some grooves (16) and controlled recesses (18). The invention is used for the assisted steering of motor vehicles.

12 Claims, 5 Drawing Sheets

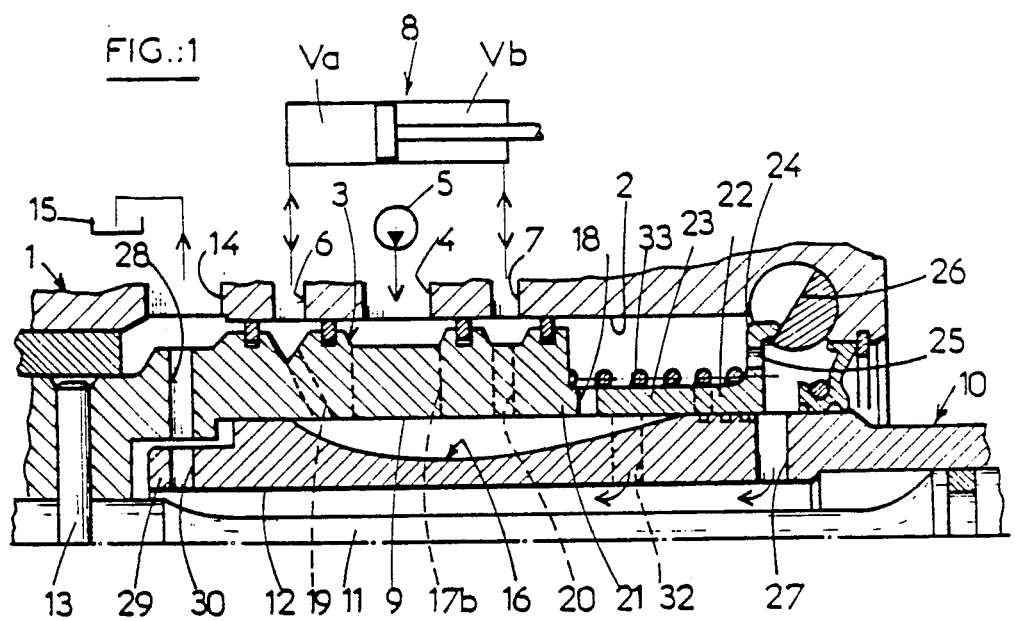
FIG.:1
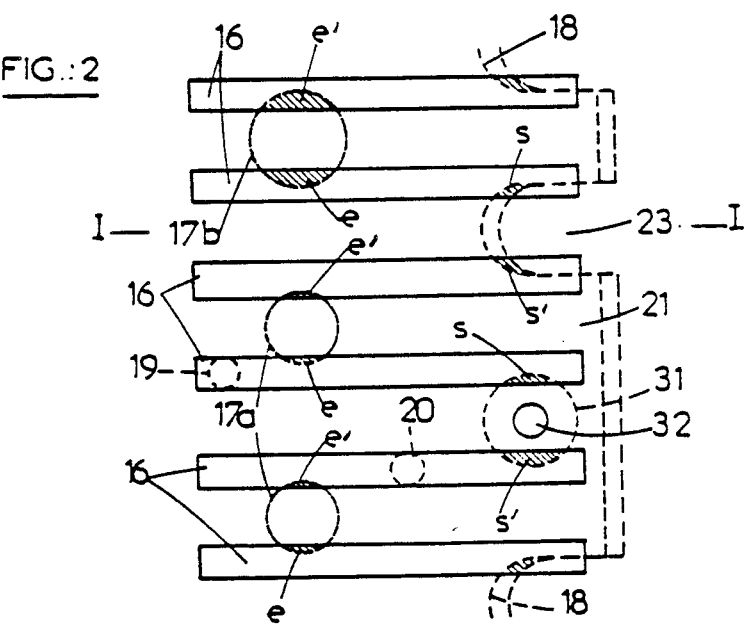
FIG.:2

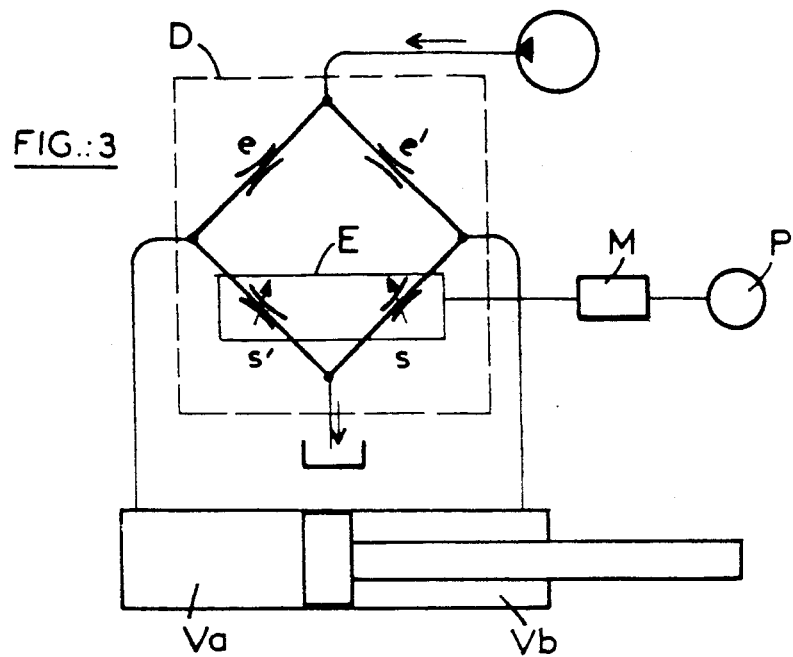
FIG.:3
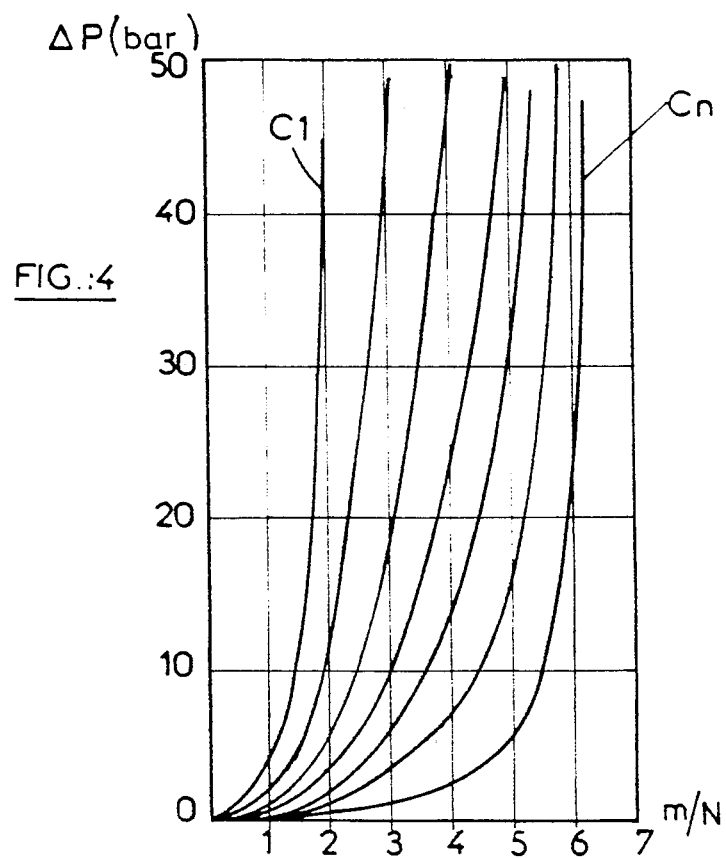
FIG.:4

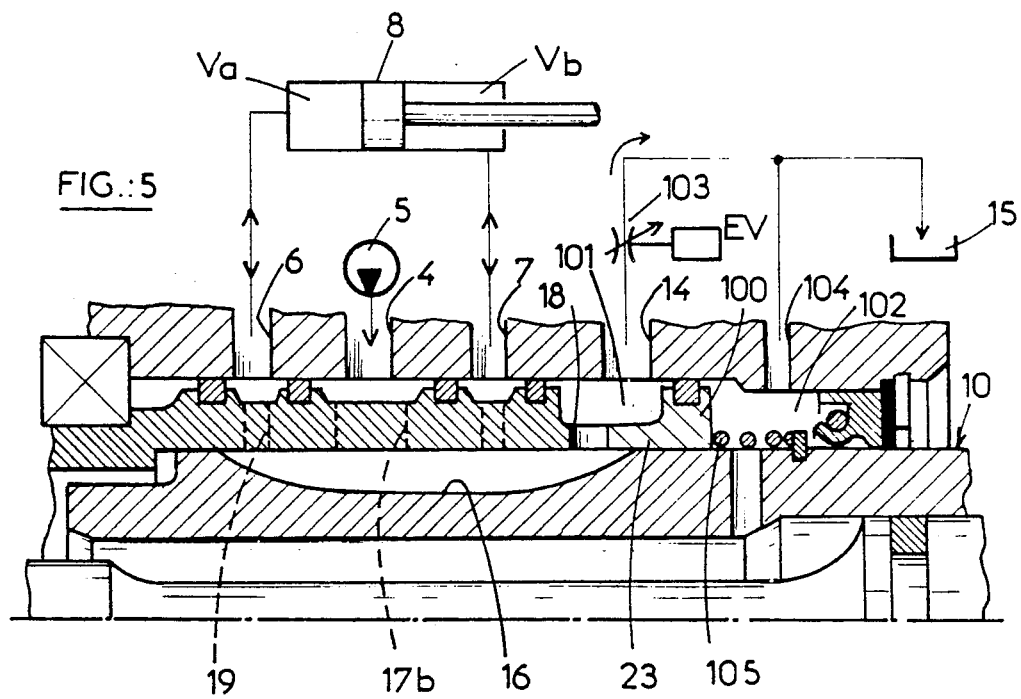
FIG.:5
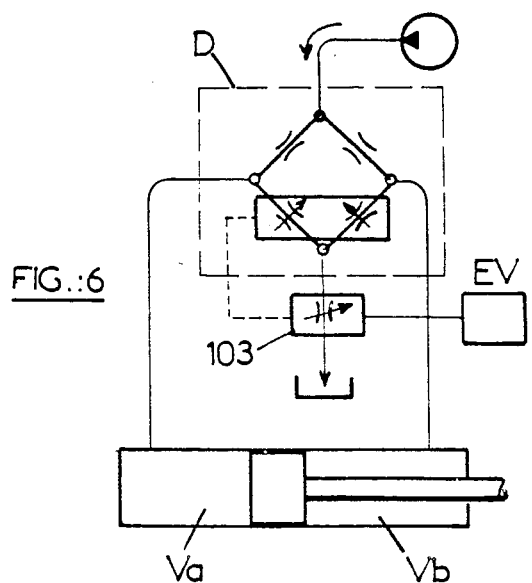
FIG.:6

ROTARY HYDRAULIC DISTRIBUTOR FOR A SERVO MECHANISM

The present invention relates to a rotary hydraulic distributor for a servo mechanism especially for assisted vehicle steering.

Devices for assisting the steering of a vehicle comprise, in a widely accepted design, a hydraulic pump, usually a constant-volume pump, driven by the vehicle engine and equipped with a flow limiter, with the result that the assembly supplies a constant flow, a fluid tank and a boosting drive means which can be a jack. The pump, tank and drive means are connected hydraulically by means of a rotary distributor which distributes the pressure between the two opposite chambers of the drive means as a function of the torque exerted on the steering column. The state of the distributor is controlled by means of a torsion bar which is inserted between the steering column and the steering housing and of which the deformations under the effect of the torque cause limited movements of one element of the distributor relative to another on either side of a neutral symmetrical position.

A rotary distributor of this type is described in EP-A No. 0,187,591, and this comprises a cylindrical external element mounted rotatably in a bore of a housing and a cylindrical internal element mounted rotatably in a bore of the external element and capable of a limited rotation on either side of a neutral position, the external element having inlet passage ports communicating with a fluid pressure source, at least one pair of distribution ports communicating selectively with one of the two opposite chambers of a drive means, and return recesses communicating permanently with the tank, the internal element itself having longitudinal grooves which are uniformly distributed angularly and which, in the neutral symmetrical position, throttle the two distribution ports in the same proportion and also ensure permanent communication between the inlet ports and the return recesses.

Such a distributor is satisfactory, but in some cases needs to be more so. In fact, for a given input torque, the relatively angular position of the external and internal elements defines the ratio of access to the two chambers of the drive means. Since the pump, with its flow limiter, supplies a constant flow of fluid, the difference in pressure between the chambers of the drive means controlling the boosting force is linked directly to the torque. In some cases, it is desirable if boosting also depends on another parameter, such as the speed or the static or dynamic load of the vehicle.

It is therefore an object of the present invention to solve this problem and, more specifically, provide a distributor of the type mentioned above, which makes it possible to vary the boosting force as desired as a function of one or more selected parameters, but without substantially increasing the overall size of the distributor or the cost price of the complete booster circuit.

It has been proposed in European Pat. No. 0,072,732 to vary the pressure difference in the chambers of the drive means by acting on the regulation of the delivery of the pump, but this solution is not very satisfactory in terms of overall size and/or cost price.

Accordingly in the present invention, there is provided a distributor of the type mentioned above, the particular feature of which is that there is, in return recesses, hereafter designated as controlled recesses, a movable throttling member which, under the effect of control means, is capable of varying the passage crossection of the fluid return between some grooves and the controlled recesses.

According to a preferred embodiment, the controlled return recesses are formed by radial indentations made in one end of the external element, the throttling members consisting of a sleeve sliding on the internal element and equipped with fingers with penetrate into the indentations.

In this case, the control means preferably comprise a component capable of rotating about an axis perpendicular to the axis of rotation of the distributor, this component carrying a cam surface which interacts with with a bearing part of the sleeve and which can be driven in rotation by means of a motor activated in response to an electrical control signal, the sleeve being held up against the cam surface by means of a spring.

Such an embodiment results in a distributor having dimensions which differ little from those of the prior art, and in a complete booster circuit which is relatively cheap.

The same is true of another embodiment of the invention, in which the control means comprise an annular piston associated with the sleeve and mounted slidably on the internal element and in the bore of the housing in order to define two cavities there, the first cavity being in communication, on the one hand, with the return recesses and, on the other hand, with the tank via throttling means activated as a function of an electrical control signal, the second cavity being in free communication with the tank, elastic means stressing the piston towards the maximum throttling position of the sleeve.

According to another embodiment of the invention, the controlled-return recesses consist of one or more groups of holes of small diameter which pass through the external element, and the throttling member consists of a sleeve which slides axially on the external element and which closes off a variable number of the holes completely or partially.

According to an expedient embodiment, which is also less costly, the control means comprise a pinion mounted on an axle perpendicular relative to the axis of rotation and not meeting it, this pinion interacting with an axially directed rack carried by the sleeve, and being actuated in terms of rotation by means of a motor controlled in response to an electrical control signal.

The invention will now be described by way of example with reference to the accompanying drawings in which:

FIG. 1 is an axial half-section through a first embodiment of a distributor according to the invention.

FIG. 2 is a laid-out diagrammatic view of the outer surface of the internal element, broken lines representing the relative positions of the ports and recesses of the external element when the distributor is in the neutral symmetrical position, and the line I—I representing the trace of the plane of FIG. 1.

FIG. 3 is a hydraulic diagram of a system equipped with the distributor according to the invention illustrated in FIG. 1.

FIG. 4 is a graph showing the variation in the differential boosting pressure as a function of the torque for different settings of the throttling member.

FIG. 5 is an axial half-section through another embodiment of the distributor according to the invention.

FIG. 6 is a hydraulic diagram of a system equipped with a distributor according to the invention illustrated in FIG. 5.

Figure 7:
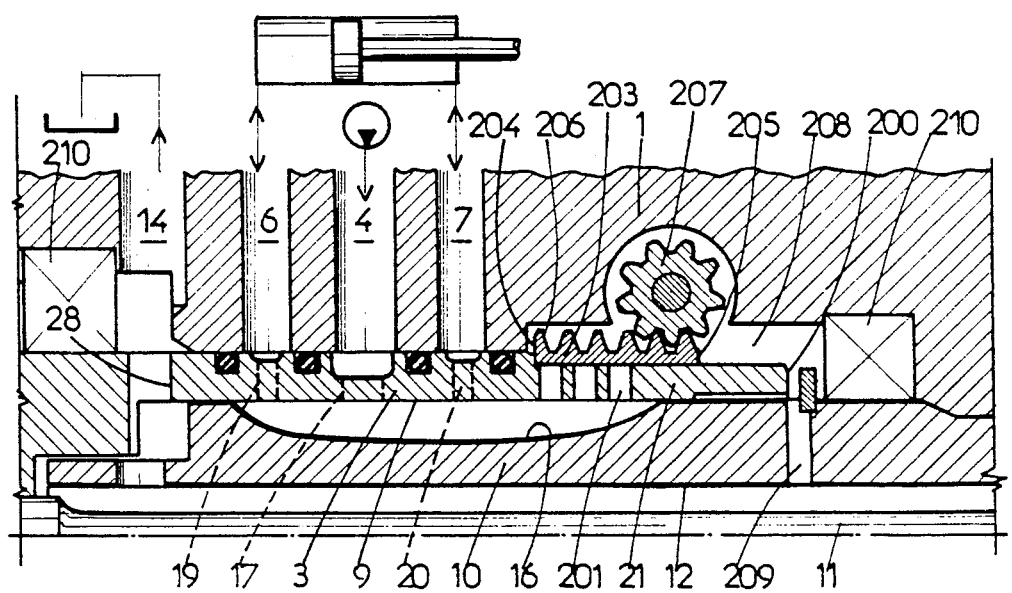
FIG. 7 is a partial axial half-section of a third embodiment of the distributor according to the invention.

The distributor shown in FIGS. 1 and 2, suitable especially for a power-assisted steering system of a motor vehicle, comprises in general a distributor housing 1 having on the inside a bore 2, in which is mounted rotatably a cylindrical external distributor element 3 intended typically to be connected to a pinion (not shown) meshing with a steering rack. The housing 1 has an inlet port 4 opening into the bore 2 and intended to be connected to a presurized fluid source 5 and, on either side of the inlet port 4, distribution ports 6 and 7 intended to be connected to the opposite chambers Va and Vb of a hydraulic booster 8. The ports 4, 6 and 7 open into the bore 2 opposite annular inlet and distribution slots separated sealingly from one another and formed in the outer periphery of the external distributor element 3. The external distributor element 3 is made with an inner bore 9, in which is mounted a cylindrical inner distributor element or rotor 10 typically intended to be connected to a distributor control member, such as a vehicle steering-wheel (not shown). The internal distributor element 10 is fixed in terms of rotation to one of a torsion bar 11 which extends in a central longitudinal receptacle 12 of the internal distributor element 10 and at the other end of which is fixed, for example by means of a stud 13, to the external distributor element 3, in an arrangement allowing limited relative rotation of the internal and external distributor elements 10 and 3 relative to one another, in order to distribute selectively the presurised fluid coming from the source 5 towards one or the other of the chambers Va and Vb of the booster 8. Near the connection zone between the external distributor element 3 and the torsion bar 11, the housing 1 has a return port 14 opening into the bore 2 and intended to be connected to a fluid tank 15.

The internal distributor element 10 has, on its periphery, six longitudinal grooves 16 uniformly distributed angularly and closed at their axially opposite ends. These grooves 16 thus define between them outer smooth bearing surface of the internal distributor element 10 which interact in rotary sliding contact with the bore 9 of the external distributor element 3. The external distributor element 3 possesses a series of three inlet passage ports uniformly distributed angularly, namely two equal ports 17a and one wider port 17b, each communicating with two adjacent grooves 16 of the internal distributor element 10 when the distributor is in the normal rest position or neutral position.

All the foregoing part of the description is common to the distributor of the invention and to that of EP-A No. 0,187,591, to which document reference can be made for more details on the basic structure of the distributor and its mode of operation.

The external distributor element 3 has a thinned axial end 21, on the right-hand side in FIG. 1, which is of the same inside diameter as the rest of the element 3, but of smaller outside diameter, and in which are formed two radial indentations 18 open to the right in FIG. 1. These indentations are arranged angularly between two different inlet ports 17a and 17b, whereas there is no indentation between the two equal ports 17a.

The depth and width of the indentations are such that, when the distributor is in the neutral symmetrical position, each of them communicates with two adjacent grooves 16, as can be seen in FIG. 2. This figure shows that two other adjacent grooves 16 do not correspond to an indentation, but to a blind hole 31. How the flow of fluid is ensured there will be seen later.

It will be noted, that in another embodiment the number of grooves 16 is twelve. There are four indentations 18 in this case.

It is appreciated that, in the conventional way, the inlet ports 17a and 17b and the return recesses formed by the indentations 18 and the hole 31 thus define, with the grooves 16, passage cross-sections or restrictions adjustable as a function of the relative rotation between the internal and external distributor elements 10 and 3, as represented by the hatched areas e, e' and s, s'. The external distributor element 3 also possesses distribution ports 19 and 20, as shown, which establish communication between the abovementioned outer annular slots of the external distributor element 3 and the adjacent longitudinal grooves 16 of the internal distributor element 10.

A cylindrical sleeve 22 of the same inside diameter as external element 3 can rotate relative to the internal element 10 and slides on it. It has fingers 23 which engage into the indentations 18 and partially block them. The outside diameter of the sleeve 22 is the same as that of the thinned end 21 of the external element 3, and on the opposite side to the fingers 23 it possesses a radial driving projection 24, through which extends an axial passage 25 for the flow of fluid.

The projection 24 interacts with a driving cam surface 26. Here, this cam surface is obtained by bisecting in an axial plane a cylindrical shaft having an axis perpendicular to the axis of the distributor. This shaft is driven in rotation by means of a motor M, itself controlled by a processor which receives and processes the signals corresponding to the data to be taken into account, such as speed, load, etc. A spring 33 pushes the projection 24 against the cam surface 26.

Starting from the axial passage 25 in the sleeve, the fluid flows via a radial passage 27 in the internal element 10 into the inner axial receptacle 12 of the latter. This receptacle 12 communicates, on the left in FIG. 1, with the return port 14 of the housing 1 via a radial through-passage 28 in the external element 3. Advantageously, the internal distributor element 10 has a thinned end 29 which extends in a cavity of reduced size provided at the end of the bore 9 and which is itself formed with a radial through-passage 30 substantially aligned, in a neutral position, with the radial throughpassage 28 in the external distributor element 3.

It was mentioned above that, in a neutral position, two grooves 16 do not correspond to an indentation. The fluid return flow from these grooves takes place in the following way: the thinned end 21 of the external element 3 has, instead of the missing indentation, a radial blind hole 31 open towards the grooves and of a diameter equal to that of the indentations 18. Opposite this blind hole 31, in the neutral position, a radial through-hole 32 is made in the internal element and communicates through the receptacle 12 to allow the fluid to flow towards the latter.

FIG. 3 shows the operating principle of the distributor. In this figure, D denotes the distributor as a whole, E the throttling member consisting, here, of the sleeve and its means of movement, M the motor driving the sleeve, and P the control processor.

The distributor is shown in its neutral symmetrical position, in which the inlet and return restrictions are substantially equal in each branch of the distributor. As a result of action taken on the sleeve, the restrictions S and s' located in the throttles controlled by the fingers 23 are throttled to a greater or lesser extent in the region of the grooves 16. This, when the distributor is activated, causes a change in the characteristic curve giving the boosting pressure Δp as a function of the input torque. A set of characteristic curves is shown in FIG. 4, where the characteristic C1 corresponds to maximum boosting obtained for maximum throttling of the sleeve, and the characteristic Cn corresponds to minimum boosting obtained from minimum throttling of the sleeve. When the invention is used for the assisted steering of vehicles, the curve C1 is sought for low or zero speeds of the vehicle, while the curve Cn is sought for high speeds.

It should be noted that the adjacent edges of the indentations 18 and of the fingers 23 can have various forms, depending on the desired profile of a given characteristic curve of power assistance. In the embodiment illustrated in FIG. 2, the forms selected are semicircular and allow an arrangement which overlaps completely in the maximum throttling position of the sleeve, the return of fluid to the tank being ensured by means of the ports 31 and 32. In an alternative version of the invention (not shown), the ports 31 and 32 are replaced by an indentation interacting with a finger 23. However, the arrangement is such that, in the maximum throttling position a return passage for the fluid to the tank remains guaranteed.

Looking at the second embodiment of the invention illustrated in FIG. 5, the elements corresponding to those described with reference to the embodiment illustrated in FIG. 1 will not be repeated in detail. In this second embodiment, the sleeve 23 is integral with an annular piston 100 sliding on the internal element 10 and on the bore 2 in order to define two cavities 101 and 102 in the latter. The cavity 101 in communication with the indentations 18 is connected to the tank 15 via throttling means 103 activated by means of an electrical control signal, for example a solenoid valve EV. The cavity 102 is connected directly and freely to the tank via the port 104. Finally, a spring 105 stresses the piston 100 and the sleeve towards the maximum throttling position. Depending on the level of throttling in the restriction 103, a given pressure differential occurs between the cavities 101 and 102. This pressure differential regulated by means of the electrical control signal is exerted on the piston 100 counter to the spring 105. The sleeve is then moved into a position of equilibrium corresponding to a specific characteristic curve of power assistance. FIG. 6 shows a hydraulic diagram of a system equipped with a distributor illustrated in FIG. 5.

Figure 9:
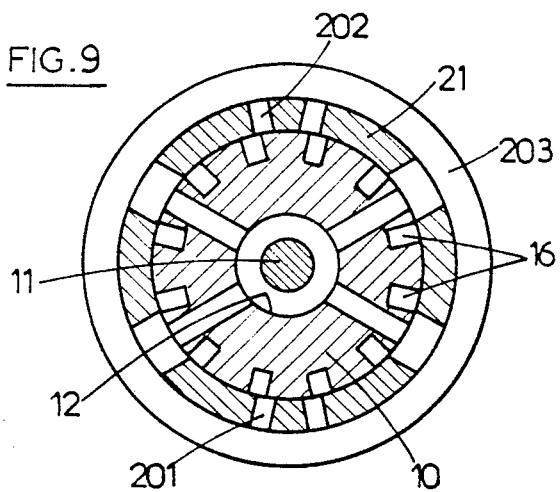
FIG. 9 is a cross-section of the distributor along the line IX—IX of FIG. 8.
Figure 8:
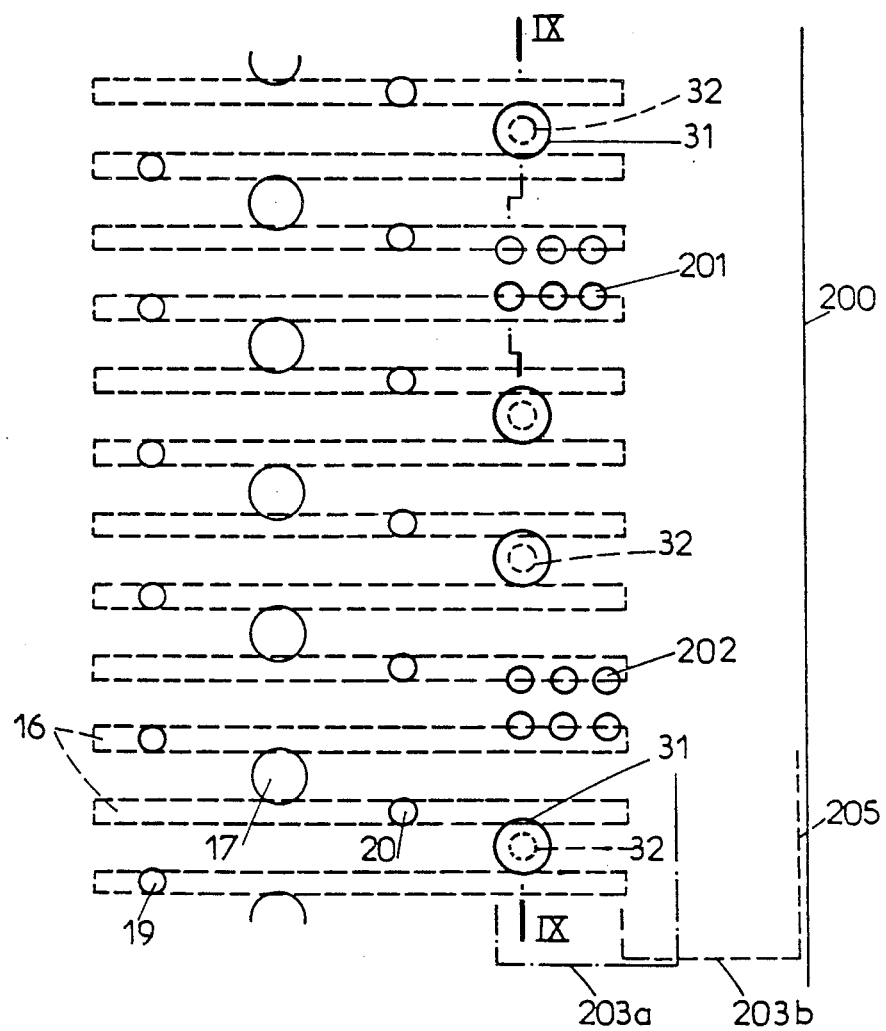
FIG. 8 is a laid-out diagrammatic view of the inner surface of the external element, with the grooves of the internal element of the distributor of FIG. 7 being represented by dashes.

FIGS. 7 to 9 illustrate a third embodiment of the invention, the elements identical or equivalent to those of the first two embodiments bearing the same references.

As shown in FIG. 8, in contrast to the first embodiment, the internal element 10 this time has twelve grooves 16, and the feed ports 17, of which there are six, are equal to one another. This difference does not correspond to a change in the mode of operation.

Whereas, in the first embodiment, the thinned axial part 21 of the external distributor had radial indentations, in the present embodiment this thinned end takes the form of a tubular part, the edge 200 of which is planar and which is pierced by a certain number of holes 201, 202 grouped in two groups of six, as shown in FIG. 8. This Figure also shows, in each group of six holes, that these are arranged in two lines parallel to the axis, which are spaced at a distance equal to the gap between two grooves 16 and the internal element, with the result that a rotation of this element about the axis closes off some holes, while at the same time opening others.

FIG. 8 also shows that the holes 201 are offset axially relative to the holes 202, to obtain a result which will be explained later.

A sleeve 203 is mounted on the end part 21 and can slide axially on it between two positions. FIG. 7 shows the position in which the sleeve is furthest to the left, and in this position the sleeve closes off the holes 201 and 202 completely, its left-hand edge 204 being further to left than the holes 201, 202, whilst its righthand edge 205 is further to the right than the same holes. In the opposite end position (not shown), the holes 201 202 are opened completely, the left-hand edge 204 of the sleeve being to the right of the holes 201, 202.

In this position, the right-hand edge 205 of the sleeve virtually coincides with the edge 200 of the end part 21. FIG. 8 shows at 203a and 203b the two end positions of the sleeve 203.

The outer face of the sleeve 203 has annular splines forming a rack 206 which interacts with a drive pinion 207 having an axis perpendicular to that of the housing, but not meeting this. Between the housing 1 and the sleeve 203 there is a space 208 which communicates with the inner recess 12 of the internal element 10 via holes 209 which open out on the outside beyond the edge 200 of the end part 21.

In the first embodiment, a flow of fluid through the internal element was provided even in the event of complete throttling of the passage controlled by means of a radial blind hole 31 opening into the external element and facing a radial through-hole provided in the internal element. This arrangement is retained in the device described here, the only difference being that the hole 31 is not a blind hole, but a through-hole which can itself be closed off by means of the sleeve 203, as a result of which it is converted into a blind hole when the sleeve is in the left-hand position in the Figure.

Thus, the return passage of the fluid is ensured, when the sleeve 203 is in its left-hand end position, by means of the holes 31 and 32, and when the sleeve 203 is in its right-hand end position an additional fluid return is ensured by means of the holes 201 and 202, the space 208 and the holes 209 located beyond the edges 200 and 205 of the end part 21 and of the sleeve 203.

The position of the holes 201 and 202 is determined so as to have a variation in the return cross-section to the tank which is progressive according to the displacement of the sleeve 203, the holes 202 being offset axially relative to the holes 201 at a distance approximately equal to the diameter of one of them.

It will be seen that, in the embodiment described, the external element 3 is not displaced in the axial direction. This made it possible, in order to connect it to the housing 1, to use sealed bearings 210 of a very common and inexpensive type.

The foregoing description related to a device having a mechanical actuation of the sleeve 203. It is possible, of course, to provide a hydraulic actuation of the type described with reference to FIG. 5. The low mass of the sleeve 203 makes such an embodiment particularly effective.

I claim:

1. A rotary hydraulic distributor for a servo mechanism, comprising a cylindrical external element mounted rotatably in a bore of a housing and a cylindrical internal element mounted rotatably in a bore of the external element and capable of a limited rotation on either side of a neutral position, the external element having inlet passage ports communicating with a fluid pressure source, at least one pair of distribution ports communicating selectively with one of two opposite chambers of drive means, and return recesses communicating permanently with a tank, the internal element having longitudinal grooves which are uniformly distributed angularly and which, in a neutral symmetrical position, throttle the distribution ports in the same proportion and also ensure permanent communication between the inlet passage ports and some of the return recesses, characterized in that said return recesses are controlled return recesses in that there is a movable throttling member which, under the effect of control means, is capable of varying a passage cross-section of fluid returning between some grooves and the controlled return recesses.

2. The distributor according to claim 1, characterized in that the controlled return recesses are formed by radial indentations made in one end of the external element, and in that the throttling member comprises a sleeve sliding on the internal element and equipped with fingers which penetrate into the indentations.

3. The distributor according to claim 2, characterized in that the control means comprises a component capable of rotating about an axis disposed perpendicular to the axis of rotation of the distributor, the component having a cam surface which interacts with a bearing part of the sleeve and which can be driven in rotation by means of a motor activated in response to an electrical control signal, the sleeve being biased against the cam surface by means of a spring.

4. The distributor according to claim 2, characterized in that the control means comprises an annular piston associated with the sleeve and mounted slidably on the internal element and in the bore of the housing in order to define two cavities, the first cavity being in communication with the return recesses and with the tank via throttling means activated as a function of an electrical control signal, the second cavity being in free communication with the tank, and elastic means stressing the piston toward a maximum throttle position of the sleeve.

5. The distributor according to claim 1, characterized in that the control means is moved by actuating means controlled by an electronic processor capable of processing signals representing various input parameters.

6. The distributor according to claim 1, characterized in that the controlled return recesses comprise one or more groups of holes of small diameter which pass through the external element, and in that the throttling member comprises a sleeve which slides axially on the external element and which closes off a variable number of the holes either completely or partially.

7. The distributor according to claim 6, characterized in that the holes of the controlled return recesses are arranged, in each group, in two lines parallel to an axis of the distributor and spaced at a distance equal to a gap between two grooves of the internal element.

8. The distributor according to claim 7, characterized in that the holes of the controlled return recesses of a group are set apart from one another in an axial direction by a gap approximately equal to a hole diameter, and the holes of one group are off-set axially relative to those of another group at a distance approximately equal to a hole diameter.

9. The distributor according to claim 8, characterized in that the control means comprises a pinion mounted on an axle disposed perpendicular relative to the axis of rotation of the distributor, the pinion interacting with an axially directed rack carried by the sleeve and being actuated in terms of rotation by means of a motor controlled in response to an electrical control signal.

10. The distributor according to claim 8, characterized in that the control means comprises a piece capable of rotating about an axis disposed perpendicular relative to the axis of rotation of the distributor, the piece carrying a cam surface which interacts with a bearing part of the sleeve and capable of being driven in rotation by means of a motor controlled in response to an electrical control signal, the sleeve being biased against the cam surface by means of a spring.

11. The distributor according to claim 6, characterized in that the control means comprises an annular piston associated with the sleeve and mounted slidably on the external element and in the bore of the housing in order to define two cavities therein, the first cavity being in communication with the return recesses and with said tank via throttling means controlled as a function of an electrical control signal, the second cavity being in free communication with the tank, and elastic means stressing the piston toward a maximum throttling position of the sleeve.

12. The distributor according to claim 11, characterized in that the control means is moved by actuating means controlled by an electrical processor capable of processing signals representing various input parameters.

* * * * *